United States Patent
Hume (12)

(10) Patent No.: US 6,223,475 B1
(45) Date of Patent: May 1, 2001

(54) METHOD AND APPARATUS FOR LINING MANHOLES

(76) Inventor: Jamie Hume, 2555 Crisas, Elkton, FL (US) 32033

( * ) Notice: Subject to any disclaimer, the term of this patent is extended or adjusted under 35 U.S.C. 154(b) by 0 days.

(21) Appl. No.: 09/525,811

(22) Filed: Mar. 15, 2000

(51) Int. Cl.[7] .................................................. E04G 11/06
(52) U.S. Cl. ........................................................... 52/21
(58) Field of Search .................................... 52/19, 20, 21, 52/169.1, 169.6, 514, 514.5; 405/150.1, 150.2, 303

(56) References Cited

U.S. PATENT DOCUMENTS

| 3,938,285 | * | 2/1976 | Gilbu | .................................. 52/169.6 |
| 5,106,440 | * | 4/1992 | Tangeman | .............................. 156/94 |
| 5,303,518 | | 4/1994 | Strickland . | |
| 5,618,616 | * | 4/1997 | Hume et al. . | |
| 5,725,328 | | 3/1998 | Schmager . | |
| 6,021,815 | * | 2/2000 | Kiest, Jr. et al. | ...................... 138/98 |

FOREIGN PATENT DOCUMENTS 8-74280  *  3/1996  (JP) ....................................... 138/98

* cited by examiner

Primary Examiner—Richard Chilcot
(74) Attorney, Agent, or Firm—Bracewell & Patterson, L.L.P.

(57) ABSTRACT

A method and apparatus for providing a liner for manholes, drainage systems, sewer system and the like, wherein multiple layers of liner material are sprayed onto the mandrel and outer shell engaging particles are embedded in and partially covered with the liner material. The liner is then placed into a mold and concrete or other suitable material is poured around the liner. The outer shell engaging particles form a mechanical bond between the liner and the concrete, thereby preventing future separation and failure of the liner.

12 Claims, 2 Drawing Sheets

METHOD AND APPARATUS FOR LINING MANHOLES

BACKGROUND OF THE INVENTION

1. Field of the Invention

The present invention relates generally to an apparatus for producing liners for manholes, drainage pipes, sewer pipes and the like.

2. Description of the Prior Art

Liners for manholes and other drainage or sewer system are known in the art. Typically, a liner is applied to a deteriorating manhole in order to rehabilitate the manhole and return it to a safe and working condition. Application of such liner systems requires that the surfaces of the existing structure be thoroughly cleaned prior to application of the liner material to insure a strong bond between the material and the underlying structure. It is also common to seal the surface of the existing structure with a watertight sealant prior to application of the liner material to prevent water and other foreign substances from leaking between the liner and the structure, thereby causing the liner to disbond and fail.

One such liner system is described in U.S. Pat. No. 5,618,616 (Hume). There a multilayered liner system is provided for rehabilitating waste water system components. The existing, deteriorated structure is thoroughly cleaned to allow proper bonding of the liner material. A first primer layer is applied to seal the surface and then a plurality of additional foam and barrier layers are applied, as required. Each layer is sprayed applied. This method is time consuming, expensive and can be dangerous, as the personnel applying the liner may be exposed to harmful chemicals in a closed space with little or no air flow.

Systems have been developed whereby an entire manhole assembly may be constructed prior to installation. Such systems are useful for replacing deteriorated or non-functional manholes in existing waste water system or for providing a chemical and corrosion resistant manhole for use in new waste water system construction. Such a system is described in U.S. Pat. No. 5,303,518 (Strickland). A plastic liner having a provisions for creating mechanical lock with an outer shell of concrete is provided wherein the a plurality of projections extend outwardly from the liner into the concrete outer shell. The concrete flows around and between the projections thereby mechanically locking the liner to the concrete. The projections are integral to the liner and therefore, the liner material must be a material capable of being molded or shaped to form such projections, for instance, polyethylene or polyvinylchloride (PVC). In certain cases, additional processing may be required to provide a completed liner. Such processing may include cutting or milling the exterior surface of the liner to provide sufficient gaps or spaces for concrete to bond to the liner.

SUMMARY OF THE INVENTION

The present invention provides a method and apparatus for producing a liner system around which a manhole, drainage system, sewer system or the like can be installed to create a lined, interior surface having a concrete outer shell. In this way, the outer shell of the manhole is protected from the harsh internal environment encountered in most sewer and drainage systems, yet the manhole does not require retrofitting to provide a liner. In addition, the liner will mechanically bond to the outer shell of the manhole to prevent separation and subsequent failure of the liner and manhole.

The apparatus of the present invention produces a liner for use in constructing manholes, drainage systems, sewer systems and the like. The apparatus typically includes a rotatable mandrel having a moving slide collar, at least one sprayer for applying liner material to the mandrel and a rock dropper capable of covering the entire length of the mandrel. The mandrel should be constructed such that the completed liner can be easily removed therefrom without breaking, cutting or otherwise damaging the integrity of the liner. For instance, the mandrel may be provided with a non-stick or reduced friction surface allowing a completed liner to simply slide off the mandrel when complete. The mandrel may be pre-sized in order to provide an adequate liner diameter. Therefore, depending on the specific application the mandrel will have varying diameter. For manhole liners, a mandrel with a 4' diameter is common. The mandrel will be rotatable such that an even coating of liner materials may be disposed on the surface thereof. Any suitable apparatus for rotating the mandrel may be used. In order to supply varying lengths of liner, the mandrel may be provided with a moveable slide collar which can be adjusted to produce a liner of a specified length.

The liner producing apparatus of the present invention also includes at least one sprayer capable of applying an even coating of liner material along the length of the mandrel. Depending on the specific application, multiple liner materials may be sprayed onto the mandrel, a plurality of sprayers may be used to avoid problems which may be caused by mixing materials in the sprayer or delays required to clean the sprayer after each material is applied. Multiple sprayers may also be used where the desired length of the liner is such that a single sprayer cannot adequately cover the entire mandrel. The sprayers may be automated. The liner material may also be applied to the mandrel manually, using hand-held, compressed air driven sprayers.

The rock dropper of the present invention is used to apply a uniform layer of rocks or other suitable particles to the mandrel after at least one coat of liner material has been applied. The rocks, once deposited on the mandrel, will be bound in place in the liner material. An additional layer of liner material may be applied to at least partially cover the rocks and form bonding loops, protrusions or bonding particles thereon. The loops being capable of forming a mechanical bond with the outer shell.

Although a liner may be produced as a single extended tube, typically, the liner is typically composed of a plurality of shorter tubes or sections which are joined to form the complete liner. The individual sections may have a flange at one or both ends capable of engaging adjacent sections such that the adjoined sections for a sufficiently tight seal to prevent leakage through the joint. A gasket may be included between each section to further aid in creating an adequate seal.

Once a liner is produced and properly sized, the liner is inserted into a larger mold. The liner is appropriately positioned within the mold and the outer shell material is then poured or injected into the mold to form the outer shell around the pre-formed liner. The loops on the liner surface extend into the outer shell material, forming a mechanical bond therewith.

In another embodiment, the liner may be used to repair existing waste water or sewage structures by providing a liner which may be inserted into the existing structure. Concrete may then be poured between the liner and the existing structure for secure the liner in place. This both strengthens the structure and provides protection against future exposure to harsh chemicals or other deteriorating or corrosive substances.

DETAILED DESCRIPTION OF THE PREFERRED EMBODIMENTS

Figure 1:
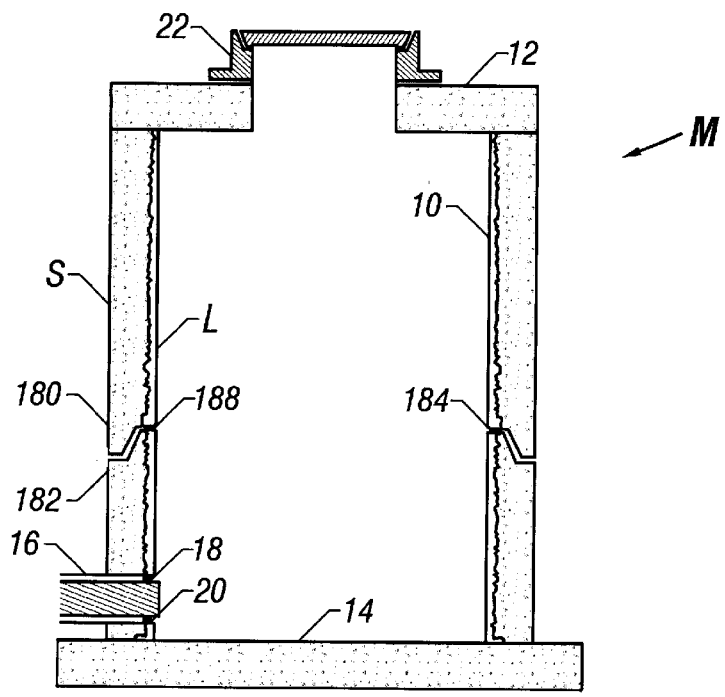
FIG. 1 is an elevation view of an installed manhole liner system.

As shown in FIG. 1, the liner system L provides an internal liner structure 10 mechanically bonded to a concrete outer shell S to form a manhole M. The liner structure 10 may be a single, elongated tube or shaft, or may be a series of smaller tubes joined to form a single unit which extends from the upper or roof portion of the manhole 12 to the floor of the manhole 14. To allow ingress and egress of water and other fluids and gases through the manhole, a pipe or other conduit 16 may be passed through a hole or opening 18 in the lower portion of the manhole. Preferably, the hole is bored through the concrete shell and liner after the manhole has been constructed. A molded hat section may be used to mount the pipe 16 in the bored hole 18 and to provide a suitable seal 20 between the hole 18 and the pipe. Benches and inverts may be added after the manhole has been installed, as required by the specific application for which the manhole is used.

Figure 2:
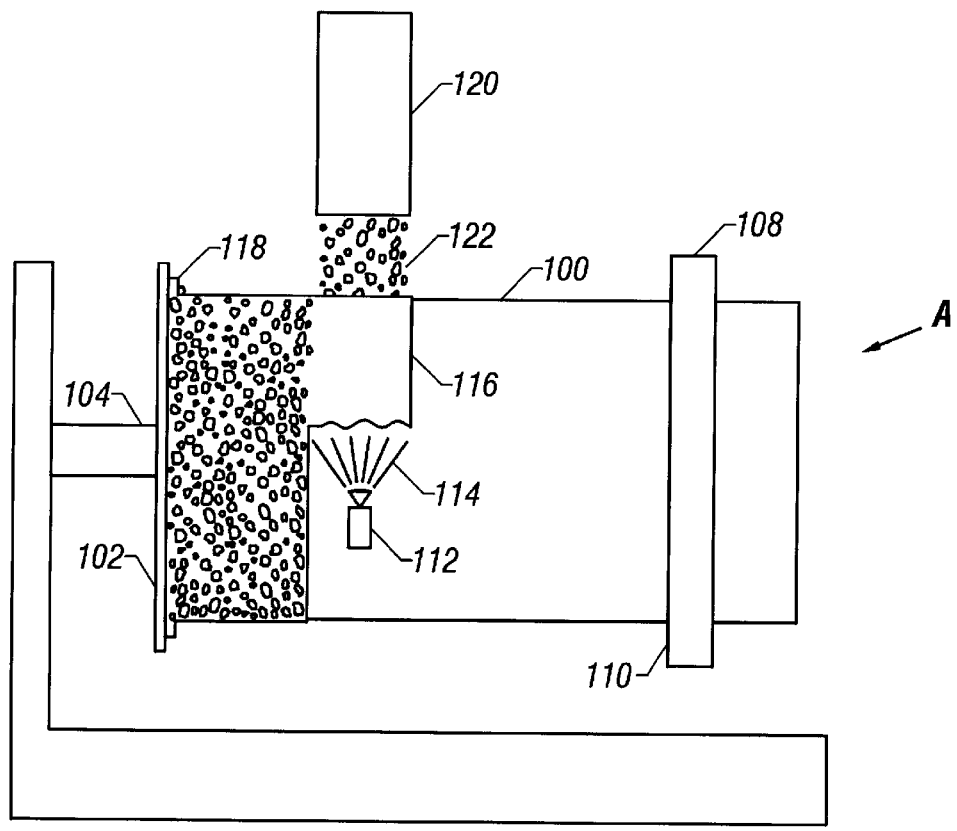
FIG. 2 is a schematic of a liner forming apparatus.

FIG. 2 shows the liner forming apparatus A of the present invention. A mandrel 100 having a predetermined diameter is provided upon which the various liner materials may be applied. The mandrel 100 may be formed from any suitable material that will allow the liner 10 to slide from the mandrel once the liner is completely formed and dried. Preferably, the mandrel is formed primarily from polyurea. The mandrel 100 may be mounted on a hub 102 positioned at one end of the mandrel. The hub 102 may have a larger diameter than the mandrel 100, thereby forming an end plate at the point of attachment between the hub and the mandrel and may be formed of any suitable material, such as stainless steel. The hub further provides a surface perpendicular to that of the mandrel, thereby providing a surface on which a flange may be formed at a first end of the liner. A shaft 104 is attached to the hub, away from the mandrel, such that the shaft is positioned along the central axis of the mandrel. The shaft 104 is attached, directly or indirectly, to a motor 106 or other apparatus capable of producing rotational motion capable of turning the entire rotating assembly, which includes the shaft 104, hub 102 and mandrel 100. The motor may be any commonly used in the industry. A slidable ring or collar 100 may be mounted along any point of the mandrel 100, said collar 108 having a surface 110 which is perpendicular to the mandrel surface for forming a flange at an end of the liner opposite that of the hub 100. The slidable collar 108 may be removed from the mandrel at an end opposite the hub to allow removal of the liner from the mandrel once the liner is completed.

The rotating assembly is rotated by the motor at a constant, predetermined speed, preferably 2–6 rpm. A spray nozzle or nozzles 112 are positioned above and at one end of the mandrel and are preferably designed to operate using compressed air. The nozzles 112 are mounted on a track to allow lateral movement of the nozzles during the application of the liner material. The nozzles are set to move a predetermined rate from one end of the mandrel to the other. The nozzles will further have a spray pattern 114 such that they are capable of completely covering a predetermined area of the mandrel on each rotation. The predetermined area is typically determined by the desired thickness of the liner material (i.e., a narrower coverage area will typically produce a thicker layer of liner material) and the speed the nozzles will move along the mandrel. The thickness of the coating material applied by the nozzles may, in part, be determined by the physical configuration of the nozzle, for instance, nozzle orifice size or diameter, and the pressure with which the liner material is supplied to the nozzle. For instance, a nozzle having a larger orifice will apply a thicker coating; likewise, providing the liner material at a higher pressure will also result in the thicker coating. The rate of movement of the nozzles along the track will depend primarily on the size and speed of rotation of the mandrel. As the mandrel 100 rotates under the nozzle 112, a coating or liner material 116 is sprayed from the nozzles onto the mandrel creating an even and uniform cylinder of liner material. At each end, a collar or flange 118 will be formed where the liner material is sprayed onto the hub or the slidable collar.

In an alternative embodiment, the nozzles may be fixed and the rotating assembly may be configured to provide for lateral movement of mandrel such that the mandrel may move laterally below the nozzles.

In yet another embodiment, the spray nozzles may be hand held and an operator may apply the liner material manually by moving the nozzle along the mandrel as it rotates and ensuring that an even and uniform coating of liner material is applied.

A rock dispensing apparatus or rock dropper 120 is positioned above the mandrel. Preferably, the rock dropper is positioned directly above the mandre. As the nozzles 112 move along the length of the mandrel, the rock dropper 120 follows along a substantially parallel, lateral path dispensing a plurality of rocks 122 or other suitable material onto the wet surface of the liner material 116. As the liner material dries, the rocks are bound or fixed in place and prevented from falling from the liner material as the mandrel rotates. The rocks create a plurality bumps or raised areas on the outer surface of the liner. The rocks may be of any suitable size, but preferably range in size from 0.5" to 0.75". In addition to rocks, any suitable material which will bond to the liner material create bumps or raised areas on the outer surface of the liner may be used.

Figure 3:
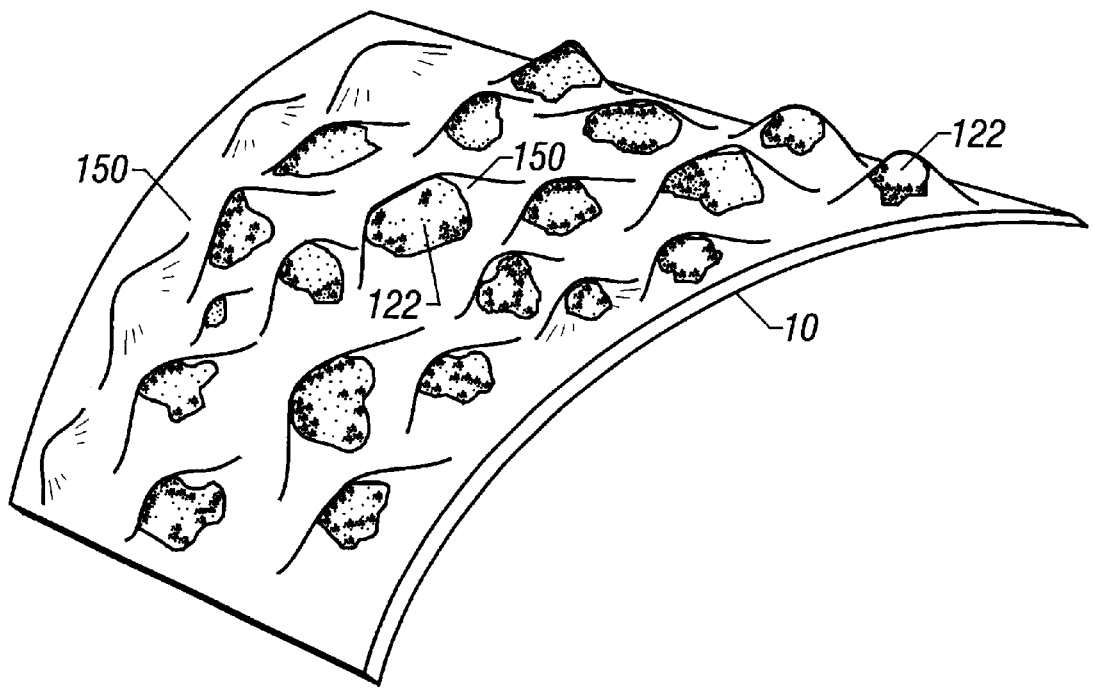
FIG. 3 is an isometric view of a portion of the liner of the present invention.

After the rocks are dispensed and bound to the surface of the liner, a second nozzle or set of nozzles, travels from a first end of the mandrel, laterally to the second end of the mandrel, in similar fashion to the first nozzles. The second set of nozzles apply a second coat of liner material, covering the first layer of liner material and the rocks embedded therein. The thickness of the second coating layer may be changed or adjusted in the same manner as the first coating layer, i.e., by altering the size of the orifice in the injector or by providing the coating material to the nozzle at a higher pressure. As shown in FIG. 3, as the second coat of liner material is applied, loops, voids or tunnels 150 form in the second coating layer between adjacent rocks 122. These loops, voids and tunnels 150 provide space wherein the concrete of the outer shell may flow, thereby creating a secure mechanical bond between the liner and the outer shell. It should be understood that the second coating layer may be applied using any of the methods of application of the first.

The liner material of the present invention is preferably a relatively quick drying polyurea. It should be understood, however, that any suitable material may be used as a liner material. The polyurea should be capable of setting before the mandrel has completed one revolution, but not before the rocks are applied. At the point in the revolution where the rocks are applied, the liner material should be tacky or sticky enough to hold the rocks in place.

The liner material may be formed as a single piece or may be formed in relatively shorter sections, depending on the specific application. Where multiple sections are used, each section may be joined mechanically, for instance, using screws, pins or the like and a gasket may be disposed between the flanges of the adjacent sections prior to joining. The sections may also be joined chemically, such as with a suitable adhesive.

Figure 4:
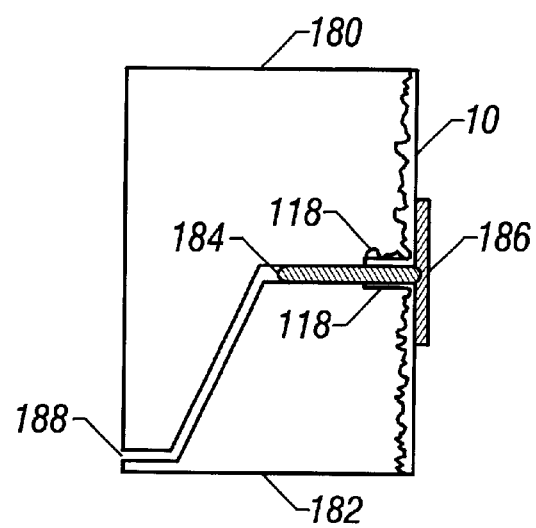
FIG. 4 is an enlarged view of a joint between two manhole sections.

To form a completed, preassembled manhole, the liner 10 is placed into the center of a mold. Preferably, an expandable support column is disposed in the center of the mold, around which the liner may be fitted. The column provides support for the liner while the concrete is poured into the mold around the liner. The area between the outer surface of the liner and the inner surface of the mold is then filled with concrete. The concrete flows completely around the liner and into the spaces formed thereon, creating a mechanical bond when the concrete is allowed to dry. Once dry, the support column may be collapsed and the entire manhole assembly may be transported to a required location. Where shorter liner segments are used, a specific application may require the stacking of more than one manhole segment. As shown in FIG. 4, a gasket material 184 may be disposed between the manhole segments 180, 182 to prevent subsequent leakage when the manhole M is placed into service. Preferably, the gasket is a Ramnek gasket. A sealant layer or tape 186 may be placed over the joint 188 where two manhole segments meet to further prevent leakage of gas or liquid into or out of the manhole. Where necessary, a hole may be cut into the manhole, such as near the bottom for drainage, sewer or other lines to attach to the manhole.

The bottom or floor of the manhole 14 may be precast simultaneously and integrally with a lower section of lined manhole, or the floor may be formed in the field at the time of installation of the manhole. The floor may be lined or unlined and is preferably formed from concrete. Similarly, the top or roof of the manhole 12 may be cast simultaneously and integrally with a upper section of lined manhole or may be formed in the field at the time of installation. The roof 12 of the manhole M is typically formed from concrete and lined with a material of the same or similar composition as that used for the manhole walls. However, it should be understood that the roof may remain unlined as well. Any ring and cover assembly 22 maybe used on top of the manhole, as is common in the industry.

The foregoing disclosure and description of the invention are illustrative and explanatory thereof, and various changes in the size, shape and materials, and components, as well as in the details of the illustrated construction may be made without departing from the spirit of the invention.

I claim:

1. A lined aggregate tubular system for the construction or repair of drainage systems, sewer systems and the like comprising:
    (a) an internal liner, said liner having a first liner layer, a plurality of outer shell engagement particles, wherein the outer shell engagement particles are rocks;
    (b) an outer shell positioned around and engaged with said internal liner.

2. The liner of claim 1, wherein the internal liner also includes a second liner layer disposed externally of said first liner layer and said engagement particles.

3. The liner system of claim 1, wherein the internal liner is formed of a plurality of adjoined liner sections.

4. The liner of claim 1, wherein the liner layer is a foam material.

5. The liner of claim 2, wherein the second liner layer is a foam material.

6. The liner system of claim 2, wherein the first liner layer and the second liner layer are polyurea.

7. The liner system of claim 1, further including a foam layer disposed between the first liner layer and the outer shell engagement particles.

8. The liner system of claim 5, wherein the foam layer is polyurethane.

9. The liner system of claim 1, wherein the outer shell is concrete.

10. A manhole comprising:
    (a) an outer shell; and
    (b) a liner having an outer surface and an inner surface and wherein said outer surface has disposed thereon a plurality of loops which provide a mechanical bond between the liner and the outer shell.

11. The manhole of claim 10, wherein the liner material is formed from polyurea and rocks.

12. The manhole of claim 10, wherein the liner material is a foam.

* * * * *